United States Patent
Burt et al.

(10) Patent No.: US 9,579,751 B2
(45) Date of Patent: Feb. 28, 2017

(54) CELLULOSE COATED STICK ELECTRODE

(75) Inventors: Randall M. Burt, Mentor, OH (US); Jon P. Chiappone, Willoughby, OH (US); Craig B. Dallam, University Heights, OH (US); Robert J. Weaver, Concord, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 2790 days.

(21) Appl. No.: 11/357,861

(22) Filed: Feb. 21, 2006

(65) Prior Publication Data

US 2007/0193994 A1    Aug. 23, 2007

(51) Int. Cl.
| | |
|---|---|
| *B23K 35/02* | (2006.01) |
| *B23K 35/22* | (2006.01) |
| *B23K 35/36* | (2006.01) |
| *B23K 35/30* | (2006.01) |
| *B23K 35/365* | (2006.01) |

(52) U.S. Cl.
CPC ...... *B23K 35/3602* (2013.01); *B23K 35/0261* (2013.01); *B23K 35/0266* (2013.01); *B23K 35/3608* (2013.01); *B23K 35/3613* (2013.01); *B23K 35/3053* (2013.01); *B23K 35/365* (2013.01)

(58) Field of Classification Search
CPC ............ B23K 35/0261; B23K 35/0266; B23K 35/3613; B23K 35/3608; B23K 35/3602; B23K 35/3053; B23K 35/365; B23K 35/368; B23K 35/302; B23K 35/308
USPC ............. 219/146.1, 145.23, 146.23, 146.22, 219/146.31, 146.32
See application file for complete search history.

(56) References Cited

U.S. PATENT DOCUMENTS

| | | | | |
|---|---|---|---|---|
| 1,760,534 | A | * | 5/1930 | Whiting et al. ................ 219/74 |
| 1,972,063 | A | * | 8/1934 | Judy .............................. 428/387 |
| 2,053,956 | A | * | 9/1936 | Humberstone et al. . 219/146.31 |
| 2,810,064 | A | * | 10/1957 | Landis et al. ............. 219/137 R |
| 3,084,074 | A | * | 4/1963 | Wasserman et al. ......... 428/552 |
| 3,118,760 | A | * | 1/1964 | Avery et al. .................. 428/385 |
| 3,124,479 | A | * | 3/1964 | Witherell ................. 219/146.22 |
| 3,447,959 | A | | 6/1969 | Hillert |
| 3,453,142 | A | * | 7/1969 | Dorschu et al. ............. 428/389 |
| 3,461,270 | A | | 8/1969 | Patton |
| 3,554,792 | A | * | 1/1971 | Johnson ................... 219/146.52 |
| 3,581,054 | A | | 5/1971 | Bjorkoth |
| 3,645,782 | A | | 2/1972 | Johnson |
| 3,742,185 | A | | 6/1973 | Parks |

(Continued)

FOREIGN PATENT DOCUMENTS

| | | |
|---|---|---|
| DE | 974 135 | 9/1960 |
| GB | 447 976 | 5/1936 |

(Continued)

*Primary Examiner* — Quang D Thanh
*Assistant Examiner* — Hemant Mathew (57) ABSTRACT

In a stick electrode for electric arc welding having a center alloy wire and an outer cellulose coating which coating includes powdered fluxing agents, alloy powder, cellulose powder and a binder. The improvement involves forming the binder as a solution of sodium silicate and 61-78 percent by weight of the binder. The binder comprises 25-35% of the coating to produce at least about 4% by weight of water in the electrode. Furthermore, the fluxing agent is titanium dioxide with a percentage greater than 12 percent of the coating.

23 Claims, 4 Drawing Sheets (56) References Cited

U.S. PATENT DOCUMENTS

| | | | |
|---|---|---|---|
| 3,764,303 A * | 10/1973 | Schmidt | 420/36 |
| 3,783,234 A * | 1/1974 | Russell | 219/145.23 |
| 3,848,109 A * | 11/1974 | Zvanut | 219/146.41 |
| RE28,326 E * | 2/1975 | Zvanut | 219/137 R |
| 4,103,067 A | 7/1978 | Jackson | |
| 4,133,935 A | 1/1979 | Dawson | |
| 4,166,879 A * | 9/1979 | Hayashi et al. | 428/385 |
| 4,220,487 A | 9/1980 | Anderson | |
| 4,224,267 A * | 9/1980 | Lugosi et al. | 419/67 |
| 4,426,428 A * | 1/1984 | Kammer et al. | 428/561 |
| 4,568,813 A | 2/1986 | Anderson | |
| 4,804,818 A | 2/1989 | Anderson | |
| 5,099,103 A * | 3/1992 | Yamada et al. | 219/145.22 |
| 5,155,333 A | 10/1992 | Wada | |
| 5,206,475 A * | 4/1993 | Wada et al. | 219/145.23 |
| 5,272,305 A * | 12/1993 | Endo et al. | 219/61 |
| 6,649,872 B2 * | 11/2003 | Kato et al. | 219/145.22 |
| 2004/0187961 A1 * | 9/2004 | Crockett | 148/23 |
| 2005/0127132 A1 * | 6/2005 | Crockett | 228/56.3 |

FOREIGN PATENT DOCUMENTS

| | | |
|---|---|---|
| GB | 573 338 | 11/1945 |
| GB | 989 148 | 4/1965 |

\* cited by examiner

CELLULOSE COATED STICK ELECTRODE

The present invention relates to the art of electric arc welding and more particularly to an improved stick electrode of the type including an outer cellulose coating.

BACKGROUND OF INVENTION

Cellulose coated stick electrodes are commonly used in pipe welding; however, they generally have a water content in the general range of 1-3 percent of the total electrode. Consequently, there is some tendency to have a certain amount of porosity in the final pass of the welding operation. Furthermore, cellular electrodes with lower stackabilty require additional passes to fill the gap between the sections forming the pipe. Stackability is the capacity of an electrode to "stack metal" into a weld joint. Depositing metal into a pipe joint with an electrode having good stackability will fill the joint in fewer passes than using an electrode with a lesser stackability. For a given electrode size under standard welding conditions, stackability is measured as the run out length, or bead length, per unit time. A short run out length is better than a long run out length because all the metal from the electrode is deposited in the same sized joint in a shorter distance. With acceptable stackability, the welder controls the weld pool, rather than the weld pool controlling the welder. Fast freezing slag and metal increases stackability. Stackability is related to the deposition rate of the metal that is actually transferred into the weld joint. The electrode to which the present invention is directed is specially designed for traveling slower and depositing heavier beads so that a welder can fill the joint between the pipe sections with fewer passes. However, there is still a desire to improve the stackability. More importantly, with a cellulose coated electrode there is a need to decrease the porosity of the upper bead as it is deposited during the welding operation by increasing the moisture content of the coating.

THE INVENTION

The present invention is directed to an improvement in a standard cellulose coated stick electrode, which electrode is designed for higher stackability. The improvement reduces the porosity tendency of the deposited weld metal, while increasing the stackability of the electrode.

The invention is an improvement in an electrode which includes a coating on a welding wire where the electrode wire or core is 80-90% of the total weight. The remaining weight of the electrode is the outer coating including a powdered cellulose, magnesium/calcium carbonate, rutile, a water glass binder and alloying particles, such as nickel, manganese and/or molybdenum, with or without iron powders. The water glass binder of the coating is about less than 35% of the coating, and preferably 28%. The binder using a conventional water glass solution of about 60 percent water has a viscosity allowing extrusion of the coating on the wire and then solidification of the coating by a subsequent heating process. Some known stick electrodes have good stackability, but have a tendency to create porosity on the cap bead. The improvement to this stick electrode constituting the invention is in the formulation of the coating to reduce the tendency to create porosity. Furthermore high stackability of the electrode is maintained. Indeed, an aspect of the invention increases stackability.

The binder is modified to decrease the tendency for undesired porosity in the cap bead of the welding operation. The amount of porosity is reduced by increasing the amount of moisture in the coating. In the past the moisture content had to be below about 3% by weight of the total electrode. This was provided by a binder constituting 15% of the coating and having about 60% water. It is known that a higher moisture content in a cellulosic electrode will reduce the porosity problems; however, an increased moisture content in the binder of the coating of the standard stick electrode causes steam bubbles at the surface of the advancing stick electrode. Such blisters change the arc direction during the welding process and decrease the quality of the weld. To prevent the formation of steam bubbles or blisters on the surface of the coating during the welding operation, the moisture in the coating has heretofore been maintained at below a level of about 3% of the electrode. It is desirable to increase this moisture content of the electrode, but it can not be done with the conventional binder now used.

The present invention solves the problem caused by increasing the moisture content in the outer coating for the stick electrode. The invention includes adding more water in the coating of the electrode without causing blistering. In this manner, the electrode reduces the amount of cap pass porosity. Furthermore, the invention involves a change in the coating to further increase the stackability during the welding process. Higher stackability for a cellulose electrode is obtained by substantially increasing the percentage of titanium dioxide from a normal level below 10% to a level substantially greater than 12%. In this manner, the electrode travels slower during the welding process and improves the stackability of the welding operation. Thus, the improvement in the existing high stackability stick electrodes is obtained by modifying the coating to increase the moisture content of the coating, without the blistering at the surface of the advancing stick electrode. The stackability is maintained and, indeed, increased by increasing the titanium dioxide forming the fluxing system of the coating to a level greater than 11% and preferably greater than 12%. By increasing the moisture content of the coating and the titanium dioxide of the coating the new stick electrode is improved.

In the existing cellulosic stick electrodes, the binder is approximately 35% of the coating and the titanium dioxide is approximately 10% of the coating. The coating is about 15% of the electrode. The invention controls the moisture in the coating to improve porosity of the weld metal by reducing the amount of binder in the coating to less than 35% and diluting the conventional water glass binder by adding about 5-30% water. The titanium dioxide is increased to at least 11% of the total coating weight.

The improvement in the binder of a diluted water glass increases the surface tension and melting point of the slag to increase the stackability and provide a better bead shape in the resulting weld metal. Stackability is also improved by increasing the titanium dioxide so that the slag solidifies faster to hold the weld metal during the solidification transformation. Thus, the change in the binder and the increase in the titanium dioxide used in the present invention increases the stackability and improves the bead shape and profile of the weld metal. Furthermore, and more importantly, the novel modification of the binder allows the inclusion of moisture in a percentage in the general range of 2-10% and, preferably, in the general range of 4-7% of the electrode. By using the improved binder concept for the coating, the solidified coating requires less time under heat so that there is no glass-like skin formed around the solidified coating. Thus, about twice as much moisture can be retained in the coating without the deleterious effects of bubbles caused by higher moisture content in a cellulose stick electrode. The outer surface of the cured or dried coating is not a glass impervious to water vapor; therefore, the surface of the cured coating will actually breathe. The arc temperature experienced during welding expels the moisture without forming steam bubbles under the surface of the electrode. These bubbles or blisters change the direction and stability of the resulting arc. Thus, higher moisture content can be incorporated in the electrode to result in better porosity in the bead of the weld metal deposited during the welding process.

In accordance with the present invention there is provided an improvement in a stick electrode of the type having a center alloy wire and an outer cellulose coating. The coating comprises powdered fluxing agents, alloy powder, cellulose powder and a binder. The improvement of the invention comprises having the binder include a diluted solution of sodium silicate and 61-78% by weight of water. In another aspect, the binder is reduced as it relates to the percentage of the coating. The use of the diluted sodium silicate and the reduced percentage of binder in the coating produces at least about 4% by weight of water in the electrode. Preferably, the moisture content of the electrode is in the general range of 5-8%. This reduces porosity and, by using the present invention, does not result in disruptive steam blisters on the advancing stick electrode.

The coating has 25-35% binder and preferably approximately 30% binder. This reduced amount of binder, together with a highly diluted water glass used as the binder, results in the increased moisture content of the electrode. In accordance with standard practice, the cellulose powder is a wood fiber and has a range of about 20-30% by weight of the coating. The fluxing agents of the coating include titanium dioxide as the primary constituent. In accordance with another aspect of the invention, the percentage of titanium dioxide is increased to a level greater than 11% of the coating. Thus, the stackability of the already good stackability electrodes is improved. This added feature is a further advantage in using the improved stick electrode of the present invention.

In accordance with still a further aspect of the present invention, there is provided a method of making a stick electrode for electric arc welding. The method comprises adding 5-30% water to conventional water glass binder, adding powdered fluxing agents, alloy powder and cellulose powder to the binder to produce a pliable, extrudable mass. The mass is extruded around the alloy welding wire and is heated to harden the mass around the wire. This method results in an improved cellulose stick electrode having an increased moisture content. By increasing the titanium dioxide, the stackability is also increased.

The primary object of the present invention is the provision of an improved cellulose stick electrode of the type designed for high stackability, wherein the moisture content from the coating is greater than about 4% of the electrode to provide reduced porosity.

Another object of the present invention is the provision of an improved stick electrode, as defined above, which stick electrode has a binder formed by a highly diluted water glass solution to reduce the solids in the coating and increase the moisture content of the electrode.

Yet another object of the present invention is the provision of an improved stick electrode, as defined above, which stick electrode has a coating wherein the titanium dioxide fluxing agent is increased to increase stackability without interfering with the improved porosity of the electrode.

A further object of the present invention is the provision of a method for making a stick electrode, which method involves the use of a highly diluted water glass solution and reducing the percentage of binder to provide an extrudable mass forming the resulting coating for the electrode.

A basic object of the present invention is the improvement of a stick electrode, as defined above, which improvement involves diluting conventional water glass with additional water and using less of this binder for the coating of the electrode. The amount of binder in the coating is slightly reduced to control extrudability.

These and other objects and advantages will become apparent from the following description taken together with the accompanying drawings.

PREFERRED EMBODIMENT

Figure 1:
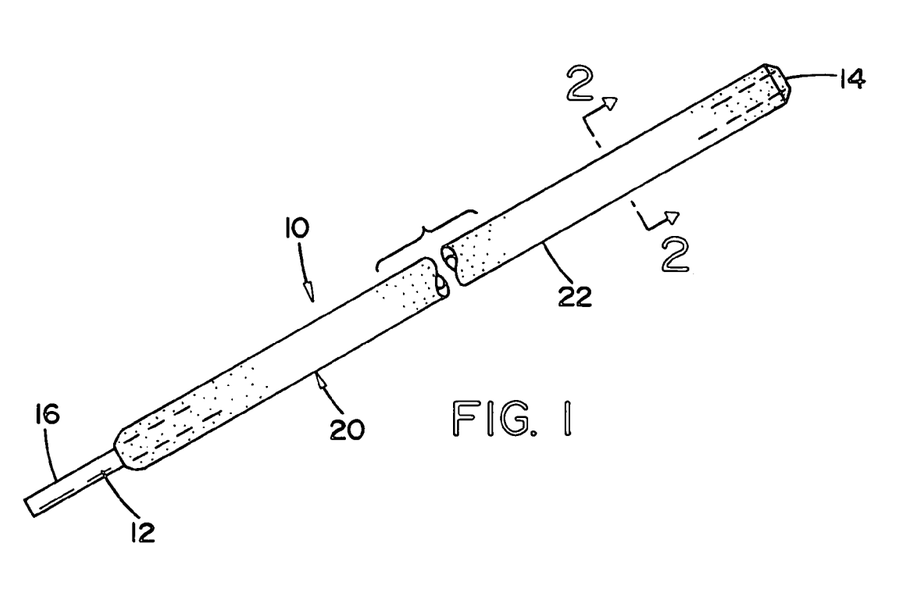
FIG. 1 is a pictorial view of a cellulose stick electrode.
Figure 2:
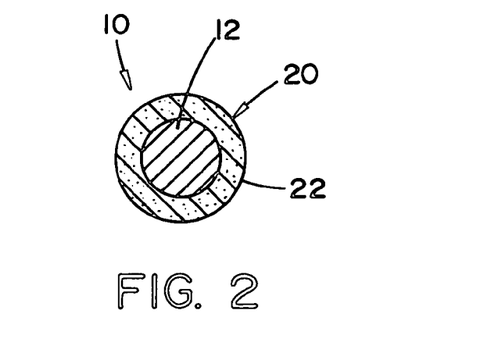
FIG. 2 is an enlarged cross-sectional view taken generally along line 2-2 of FIG. 1.

In pipe welding, the welding process is vertical down around two sides of the pipe and is performed by a stick electrode, as shown as electrode 10 in FIGS. 1 and 2. Electrode 10 has a center rod or alloy wire 12 and a trimmed welding or strike end 14 and a cleaned hold end 16. Outer coating 20 has an outside surface 22. In pipe welding, coating 20 is normally a cellulose type coating using wood fiber or other cellulose particles so the particles can create shielding gas during the welding operation by decomposing into a carbon oxide gas. The welding on a pipe is vertical down, the bulk factor of the cellulose powder in coating 20 assists in holding the metal in place as the welding operation progresses. The present invention relates to a cellulose stick electrode with a cellulose based outer coating 20 as disclosed in FIGS. 1 and 2. In the prior art, such stick electrodes have a maximum of about 3% moisture resulting from water in the binder of the electrode. This level is low and sometimes results in porosity of the cap weld bead, which is an undesirable characteristic in the welding operation. Thus, there is a need for a cellulose coating for a stick electrode which has the capability of increasing the moisture content of the total electrode without blistering. Characteristics and improvements of electrode 10 constructed in accordance with the present invention are set forth in the introductory portion of this application and are hereby incorporated into the description of the preferred embodiment so there is no duplication regarding the merits and definitions of the present invention. Stick electrode 10 has cellulose outer coating 20 comprising powdered fluxing agents, alloy powder, cellulose powder to produce stability and shielding gas and a binder. The binder includes a solution of sodium silicate and 61-78% water. The binder comprises 25-35% of the coating to produce at least 4% by weight of moisture of the total electrode. Preferably the binder is approximately 61-78% water and the diluted binder is reduced to approximately 30% of the coating. The binder of the present invention is water glass which is a liquid phase of sodium silicate including about 2-4 times the silicon dioxide in relation to sodium oxide and, conventionally 60% water. The prior art cellulose coating included moisture which was substantially less than 3% of the total weight of the electrode. The present invention employs the concept of diluting the conventional sodium silicate solution by adding 5-30% by weight of water and then reducing the amount of diluted binder in the coating. In this manner, the amount of moisture in the coating increases so the total moisture of the electrode is over 4% and preferably between about 5-8%. This reduces weld metal porosity. The alloying powder in coating 20 is normally nickel, manganese and ferro molybdenum. These alloy powders are combined with powdered cellulose in the form of wood fiber. The binder also includes a slag forming powder, such as a carbonate to produce a certain amount of shielding gas, iron powder and the highly diluted binder. Electrode 10 using these powdered constituents held together by the highly diluted sodium silicate has the following composition.

TABLE 1

| | |
|---|---|
| powdered cellulose | 20–30% |
| magnesium/calcium carbonate | less than 5% |
| titanium dioxide | 12–15% |
| binder with 61% to 78% water | 28–35% |
| metal powder | 22–30% |

By using this invention, the moisture content of electrode 10 is increased to a level of about 4-8% moisture. This decreases the porosity of the welding bead in the pipe welding operation. The binder is preferably about 30% of the coating which is a reduction from the traditional 35% used in prior art electrodes. The amount of binder is reduced while the moisture content is increased; however, the increase in the moisture content by diluting the binder can not be such to provide a reduction in the viscosity to inhibit the necessary extruding operation to be explained later. Thus, the moisture content of coating 20 is not greater than about 10% of the total electrode and still maintains an extrudable mass. All particles of the binder are mixed together and have an amount of moisture to define an extrudable mass.

In accordance with another aspect of the present invention, the titanium dioxide forming the main constituent of the fluxing system for coating 20 is increased from the traditional 10% to greater than 11% and preferably 12%. This increase in titanium dioxide slows down the travel speed to increase the stackability of the weld metal. Thus, increasing the titanium dioxide to 11-15% increases stackability and increases the amount of weld metal deposited in the groove between the pipe sections. The increase of titanium dioxide, in combination with the highly diluted binder, forms the primary aspect of the present invention. This primary aspect allows the increased moisture and thus better porosity without the need for modifying the welding operation to assure low porosity of the cap bead.

Figure 3:
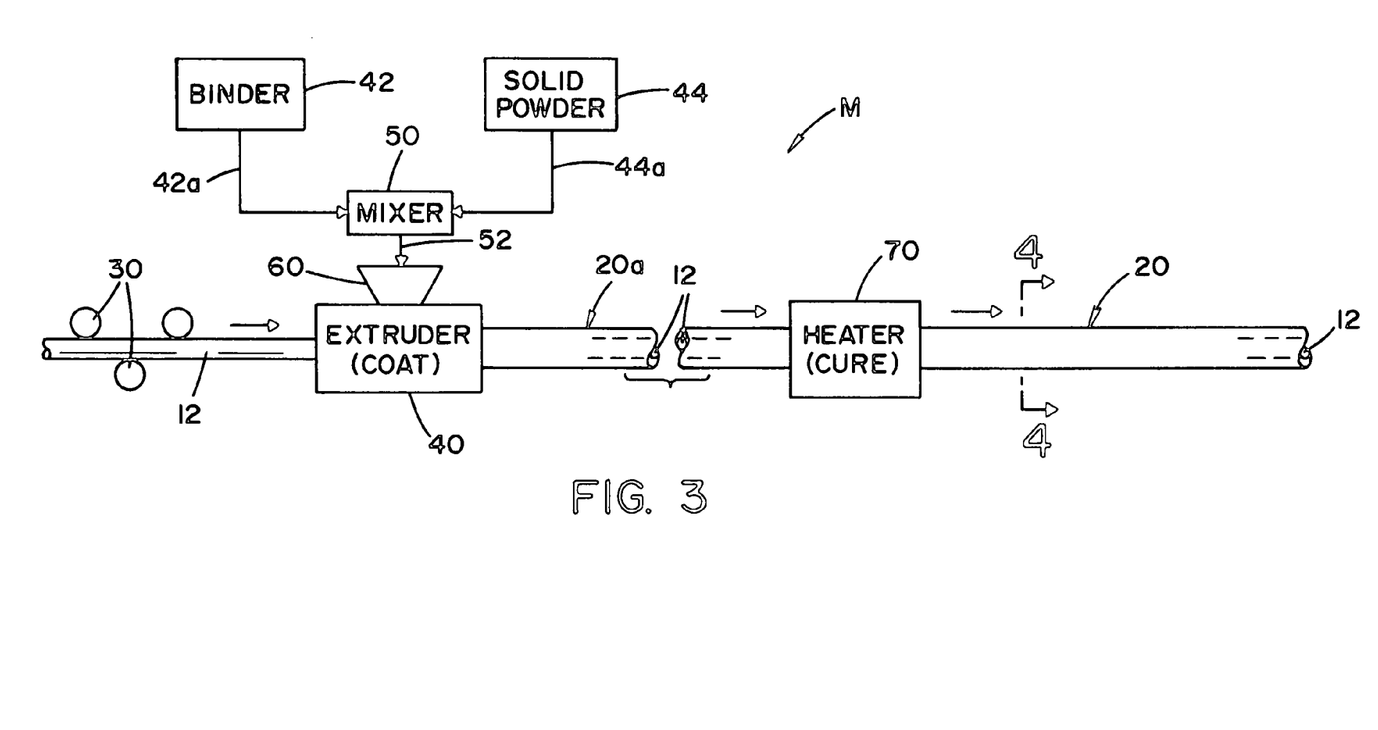
FIG. 3 is a schematic flow diagram illustrating a portion of the manufacturing line for a stick electrode of the type to which the present invention is directed.
Figure 4A:
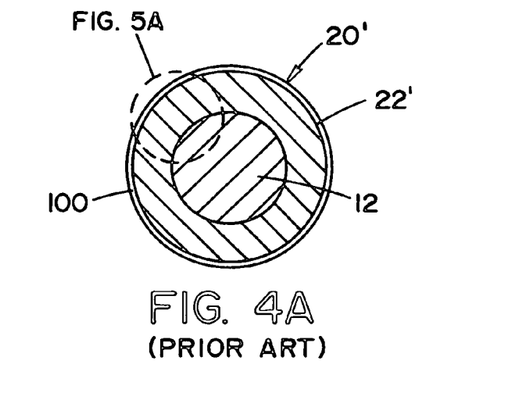
FIG. 4A is an enlarged cross-sectional view taken generally along line 4-4 of FIG. 3 illustrating the prior art coating to which the invention is directed.
Figure 4B:
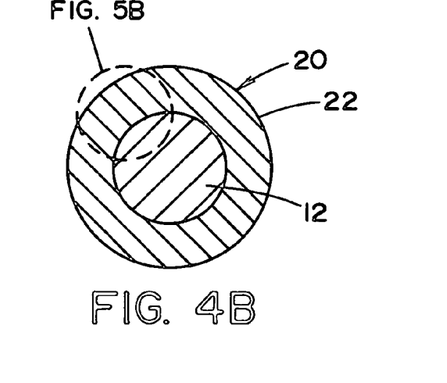
FIG. 4B is an enlarged cross-sectional view taken generally along line 4-4 of FIG. 3 illustrating the coating of the present invention.
Figure 5A:
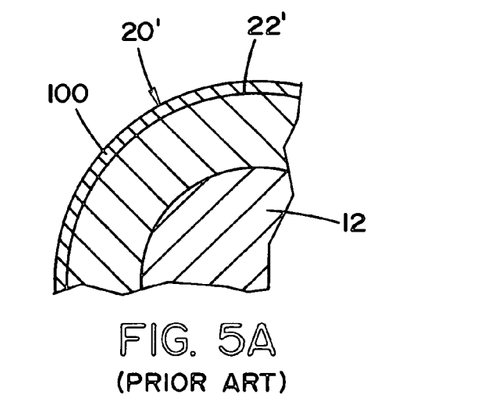
FIG. 5A is a partial enlarged cross-sectional view from the circle area 5A of FIG. 4A.
Figure 5B:
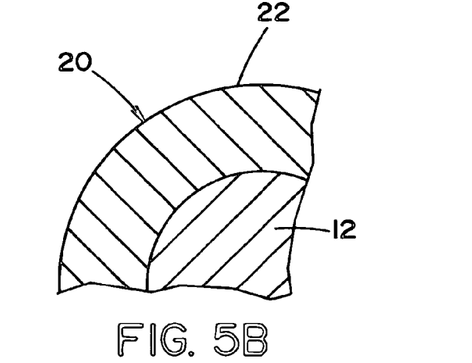
FIG. 5B is a view similar to FIG. 5A from the circle area 5B of FIG. 4B.

Manufacturing of stick electrode 10 involves extruding coating 20 over wire 12 and then drying the coating by a heating process that drives out a certain amount of moisture. In accordance with the invention the remaining moisture is in the general range of 4-8% by weight of the electrode. Before drying, top end 16 of electrode 10 is brushed to expose wire 12 for the purposes of mounting into an electrode holder for the welding process. Coating on strike end 14 is chamfered to expose wire 12. In manufacturing the electrode, the present invention involves segment M of the manufacturing process. In this manufacturing process, wire 12 is moved as indicated by the arrow in FIG. 3 through guide rolls 30 into a standard extruder 40. The water diluted binder of the present invention is stored in supply 42, while the solid powder constituents of coating 20 are stored in supply 44. Outputs 42a, 44a direct the highly diluted liquid binder and the solid powders into mixer 50 which is a mechanical rotary mixer to form and direct an extrudable mass through output line 52 into hopper 60 of extruder 40. Then, the extruder places an extruded flowable solid mass 20a onto wire 12, as the wire moves toward dryer 70. The dryer solidifies or hardens mass 20a into the outer hardened coating 20. The drying or hardening process drives a certain amount of moisture from the coating, but the amount of moisture in the diluted binder from supply 42 is such that the drying process still retains at least 4-8% by weight water. Preferably, the moisture content of the dried or hardened coating is greater than 5% moisture. In the prior art, as shown in FIGS. 4A, 5A, the drying process forms coating 20' with an outer thin skin 100 around surface 22'. This skin is created by heating the sodium silicate solution at the surface. This process hardens a thin layer around coating 20'. The present invention dilutes the binder so it does not form an impervious outer skin 100. Thus, as shown in FIGS. 4B, 5B, coating 20 has a surface 22 which is free of a hardened skin and, thus, allows a migration of moisture through the coating to the atmosphere during the welding process having the advantage that will be discussed in connection with FIGS. 6-8 and is mentioned in the introduction.

Figure 6:
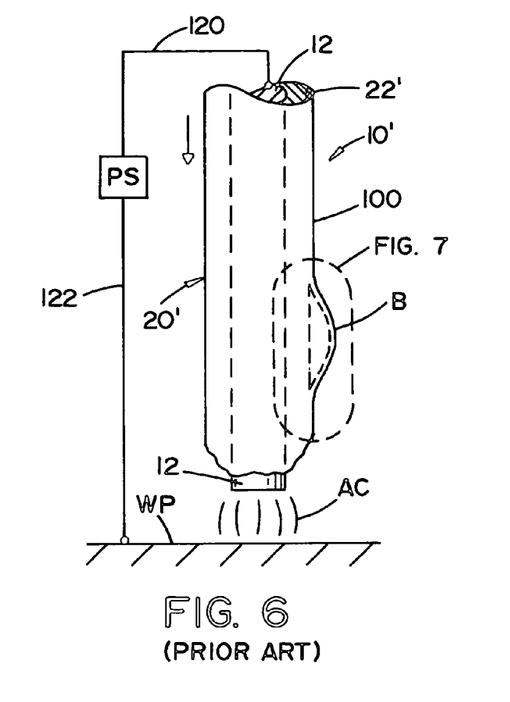
FIG. 6 is an enlarged partial cross-sectional view illustrating a cellulose stick electrode of the prior art as used in a welding process.
Figure 7:
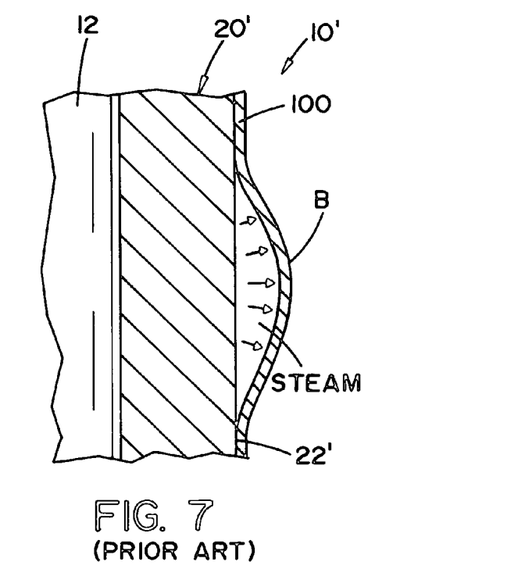
FIG. 7 is an enlarged partial cross-sectional view taken from circle area "FIG. 7" of FIG. 6; and, FIG. 8 is an enlarged cross-sectional view similar to FIG. 7 illustrating an improvement obtained by using the present invention.
Figure 8:
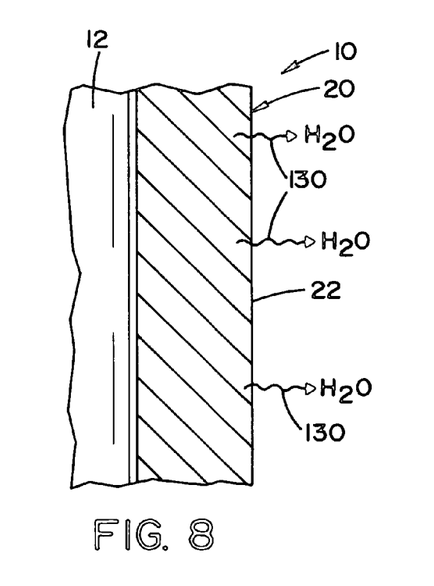

Prior art electrode 10' shown in FIGS. 6 and 7 is used in a pipe welding operation wherein the electrode is melted by arc AC to form weld metal on workpiece WP which is the groove between two pipe sections. Power supply PS has output leads 120, 122 for creating electrical current between the electrode and workpiece to generate arc AC. During this welding operation, the arc develops high temperatures at the advancing end of electrode 10'. This high temperature boiled the moisture in coating 20' to cause surface blisters B. These blisters deflected arc AC and generally made the welding process erratic. Consequently, in the prior art, the moisture content of electrode 10' was less than 3% of the total weight of electrode 10' to reduce the tendency to cause blisters. There was no ability to increase the moisture content of coating 20' to decrease the porosity problems of the weld bead because of the erratic nature of the welding process when high water content was employed in the coating. In accordance with the present invention, use of the highly diluted binder does not form a concentration of sodium silicate at surface 22 so electrode 10, as shown in FIG. 8, has a hardened coating 20 without the outer hardened skin 100. The lack of an impervious skin allowed the moisture 130 to escape through surface 22 as necessary while still directing a large percent of moisture into the welding process itself. In this manner, porosity is better and the stackability associated with cellulose electrode 10' is still maintained. To increase the stackability of novel electrode 10, the titanium dioxide forming the basic flux constituent is increased to over 11% of the coating and primarily in the general range of 11-15%. In practice, the amount of titanium dioxide is 12%. Thus, stick electrode 10 has a new cellulose coating 20 with a high moisture content and an increased titanium dioxide level to improve the characteristics of the welding process.

Having thus defined the invention, the following is claimed:

1. A cellulosic stick electrode for electric arc welding, said cellulosic stick electrode comprising a center wire and a cellulosic outer coating, said cellulosic outer coating comprising:
   powdered fluxing agents, including titanium dioxide in the amount of 11-15 weight percent of the cellulosic outer coating;
   20-30 weight percent cellulose powder
   5-35 weight percent binder, and
   a water content greater than 3 weight percent and less than or equal to 10 weight percent of said stick electrode.

2. The cellulosic stick electrode as defined in claim 1, wherein said center wire constitutes 80 to 90 weight percent of said cellulosic stick electrode.

3. The cellulosic stick electrode as defined in claim 1, wherein said water content is at least 4 weight percent of said stick electrode.

4. The cellulosic stick electrode as defined in claim 2, wherein said water content is at least 4 weight percent of said stick electrode.

5. The cellulosic stick electrode as defined in claim 1, wherein said cellulosic outer coating includes greater than 12 weight percent titanium dioxide.

6. The cellulosic stick electrode as defined in claim 4, wherein said cellulosic outer coating includes greater than 12 weight percent titanium dioxide.

7. The cellulosic stick electrode as defined in claim 1, wherein said binder includes a solution of sodium silicate and water, said water constituting 61-78 weight percent of solution.

8. The cellulosic stick electrode as defined in claim 6, wherein said binder includes a solution of sodium silicate and water, said water constituting 61-78 weight percent of solution.

9. The cellulosic stick electrode as defined in claim 1, wherein said outer coating additionally comprises a carbonate compound.

10. The cellulosic stick electrode as defined in claim 9, wherein said carbonate compound constitutes less than 5 weight percent of said outer coating.

11. The cellulosic stick electrode as defined in claim 1, wherein said outer coating constitutes 13-16 weight percent of said stick electrode.

12. The cellulosic stick electrode as defined in claim 9, wherein said outer coating constitutes 13-16 weight percent of said stick electrode.

13. The cellulosic stick electrode as defined in claim 1, wherein said cellulosic outer coating of said stick electrode additionally includes by weight percent:

| | |
|---|---|
| powdered cellulose | at least 20% |
| magnesium/calcium carbonate | less than 5% |
| Titanium dioxide | at least 12% |
| binder | up to 35% |
| metal powder | up to 36% |

14. The cellulosic stick electrode as defined in claim 11, wherein said cellulosic outer coating of said stick electrode additionally includes by weight percent:

| | |
|---|---|
| powdered cellulose | at least 20% |
| magnesium/calcium carbonate | less than 5% |
| Titanium dioxide | at least 12% |
| binder | up to 35% |
| metal powder | up to 36% |

15. The cellulosic stick electrode as defined in claim 12, wherein said cellulosic outer coating of said stick electrode includes by weight percent:

| | |
|---|---|
| powdered cellulose | 20–30% |
| magnesium/calcium carbonate | less than 5% |
| Titanium dioxide | 12–15% |
| binder | 28–35% |
| alloy metals | 15–20% |
| iron powder | 13–16% |

16. A method of making a cellulosic stick electrode for electric arc welding, said method comprising:
   (a) providing a binder;
   (b) adding powdered fluxing agents and cellulose powder to said binder to produce an extrudable mass;
   (c) extruding said mass around a moving welding wire to form a cellulosic outer coating on said welding wire; and,
   (d) heating said outer coating to hardened said mixture around said welding wire,
said cellulosic outer coating comprising 5 to 35 weight percent binder, powdered fluxing agents, including titanium dioxide in the amount of 11-15 weight percent of the cellulosic outer coating, 20-30 weight percent cellulose powder, and a water content greater than 3 weight percent and less than 10 percent of said cellulosic stick electrode.

17. The method as defined in claim 16, wherein said welding wire constitutes 80 to 90 weight percent of said cellulosic stick electrode.

18. The method as defined in claim 16, wherein said water content is at least 4 weight percent of said cellulosic stick electrode.

19. The method as defined in claim 16, wherein said cellulosic outer coating includes 12 to 15 weight percent titanium dioxide.

20. The method as defined in claim 16, wherein said binder includes a solution of sodium silicate and water, said water constituting 61-78 weight percent of solution.

21. The method as defined in claim 16, wherein said cellulose powder constitutes at least 20 weight percent of said cellulosic outer coating.

22. The method as defined in claim 16, wherein said cellulosic outer coating of said cellulosic stick electrode includes by weight percent:

| | |
|---|---|
| powdered cellulose | at least 20% |
| magnesium/calcium carbonate | less than 5% |
| Titanium dioxide | at least 12% |
| binder | up to 35% |
| metal powder | up to 36% |

23. A method for improved the stackability properties of a electrode during an arc welding process and maintaining low porosity of a cap bead during a welding process, said method comprising:

a) providing a cellulosic stick electrode, said cellulosic stick electrode comprising a center wire and a cellulosic outer coating, said cellulosic outer coating including powdered fluxing agents including 11 to 15 weight percent titanium dioxide, 20-30 weight percent cellulose powder, 5 to 35 weight percent binder, and a water content greater than 3 weight percent and less or equal to 10 percent of said stick electrode; and,
b) at least partially melting said electrode to form a weld bead.

* * * * *